(12) United States Patent
Mo et al.

(10) Patent No.: US 9,170,675 B2
(45) Date of Patent: Oct. 27, 2015

(54) NOISE REDUCTION METHOD, DEVICE AND SYSTEM ON THE BASIS OF TOUCH DETECTION OF A CAPACITIVE SCREEN

(75) Inventors: Lianghua Mo, Shenzhen (CN); Chen Li, Shenzhen (CN); Jingkai Zhang, Shenzhen (CN)

(73) Assignee: FocalTech Systems, Ltd., George Town, Grand Cayman (KY)

( * ) Notice: Subject to any disclaimer, the term of this patent is extended or adjusted under 35 U.S.C. 154(b) by 143 days.

(21) Appl. No.: 13/611,668

(22) Filed: Sep. 12, 2012

(65) Prior Publication Data

US 2014/0002412 A1    Jan. 2, 2014

(30) Foreign Application Priority Data

Jun. 29, 2012    (CN) .......................... 2012 1 0227065

(51) Int. Cl.
*G06F 3/045* (2006.01)
*G06F 3/041* (2006.01)
*G06F 3/044* (2006.01)

(52) U.S. Cl.
CPC .............. *G06F 3/0416* (2013.01); *G06F 3/044* (2013.01); *G06F 3/0418* (2013.01)

(58) Field of Classification Search
CPC ....... G06F 3/044; G06F 3/041; G06F 3/0416; G06F 3/0418
See application file for complete search history.

(56) References Cited

U.S. PATENT DOCUMENTS

| | | | |
|---|---|---|---|
| 8,514,189 B2 | 8/2013 | Wu et al. | |
| 2009/0244014 A1* | 10/2009 | Hotelling et al. | 345/173 |
| 2011/0031042 A1 | 2/2011 | Wu et al. | |
| 2011/0037723 A1* | 2/2011 | Huang et al. | 345/174 |
| 2011/0163992 A1* | 7/2011 | Cordeiro et al. | 345/174 |
| 2011/0273402 A1 | 11/2011 | Hotelling et al. | |
| 2011/0310054 A1* | 12/2011 | Souchkov | 345/174 |
| 2012/0105362 A1* | 5/2012 | Kremin et al. | 345/174 |

(Continued)

FOREIGN PATENT DOCUMENTS

| | | |
|---|---|---|
| CN | 1197555 A | 10/1998 |
| EP | 0818751 A1 | 1/1998 |
| TW | 343313 | 10/1998 |

(Continued)

OTHER PUBLICATIONS

First Chinese Office Action regarding Application No. 201210227065.0 dated Sep. 6, 2015. Partial English translation provided by Unitalen Attorneys at Law.

*Primary Examiner* — Lixi C Simpson
(74) *Attorney, Agent, or Firm* — Harness, Dickey & Pierce, P.L.C.

(57) ABSTRACT

It is provided a noise reduction method, device and system on the basis of touch detection of a capacitive screen. The noise reduction method includes: sending a first scanning waveform to all receiving terminals by a first sending terminal and then sending a second scanning waveform to all the receiving terminals by a second sending terminal during a detection time period, wherein the phase of the first scanning waveform is continuous with that of the second scanning waveform and the first scanning waveform has a same frequency as that of the second scanning waveform; and filtering a signal received by the receiving terminals after demodulating it. Non-gap scanning can be achieved by performing continuation process to the scanning waveform, i.e. by achieving that the phases are continuous and the frequencies are the same.

14 Claims, 4 Drawing Sheets

(56) References Cited

U.S. PATENT DOCUMENTS

2013/0063396 A1* 3/2013 Kim et al. .................... 345/174
2013/0127773 A1* 5/2013 Kwon et al. ................. 345/174

FOREIGN PATENT DOCUMENTS

| TW | 201106212 A | 2/2011 |
| TW | 201131443 A | 9/2011 |

* cited by examiner

NOISE REDUCTION METHOD, DEVICE AND SYSTEM ON THE BASIS OF TOUCH DETECTION OF A CAPACITIVE SCREEN

FIELD OF THE INVENTION

The present invention generally relates to the technical field of touch detection for a capacitive screen, and in particular to a noise reduction method, device and system on the basis of touch detection of a capacitive screen.

BACKGROUND OF THE INVENTION

Capacitive screen is a mainstream screen at current stage, and is widely used in the field of mobile terminal such as a mobile phone or a tablet personal computer. The projected capacitive screen type of the capacitive screen includes a self-capacitance screen and a mutual-capacitance screen. Taking a mutual-capacitance screen as an example, the structure of the mutual-capacitance screen includes a number of sending terminals TXs and a number of receiving terminals RXs. When touch detection is performed to the mutual-capacitance screen or the mutual-capacitance is detected for obtaining its magnitude, a sending terminal sends a scanning waveform of a certain magnitude and frequency. The scanning waveform may be a sine wave, a square wave, a trapezoidal wave and the like. The magnitude of the signal received by the receiving terminal will be adjusted by a demodulator, and the magnitude is tend to be affected by a mutual-capacitance at an intersection point of a sending terminal and a receiving terminal, and the magnitude of the mutual-capacitance reflects the position of the touch.

When the scanning waveform at the sending terminal is mixed with an interference signal such as an environmental noise, a RF noise or an impulse noise, the interference signal will be passed to the receiving terminal and affect the judgment of change in the amplitude of the signal at the receiving terminal, which leads to an inaccurate test result and affects the user experience of the capacitive screen. A signal of a fixed frequency such as a direct current signal may be output at the receiving terminal after demodulation of a normal excitation signal. But an alternating current signal of a certain frequency will be formed after demodulation of the interference signal. In order to filter out the alternating current signal, a noise reduction method in the detection of capacitive screen generally performs the filtering before and after the demodulation. The performance of the filtering determines the effect of the noise reduction.

Some of the existing filters are usually designed to have an accumulator structure. It is easier to implement the filtering function, since the accumulator requires only an addition unit. The performance of the accumulator depends on the duration for the accumulation. According to the results of frequency spectrum characteristic analysis of the structure of the accumulator in a low-pass filter, a cutoff frequency and high frequency attenuation are compressed in proportion to the increment of the duration for accumulation. That is to say the performance of the filter will be improved as the duration for accumulation being extended. For filters of other structures, a filter with a narrower bandwidth can achieve better noise reduction performance. However the filter may output stability data only after a period of time delay so as to achieve the function of filtering, and the narrower the bandwidth of the filter, the longer the time delay. Therefore, the filter may not be able to achieve the desired filtering effect if the amount of the input signals is relatively little, thereby the reliability of the output signal is affected. Based on the above case, according to the existing noise reduction method, the performance of noise reduction can be improved by increasing the number of the scan channels, i.e. by increasing the amount of the signals participated in the filtering process. However, since the length of the scanning waveform and the length of the scanning frame are limited, extending the scanning time at the sending terminal is limited, and therefore, increasing the amount of the signals is also limited. Moreover, since it is needed to control processes including the scanning and the demodulation simultaneously for increasing the number of the scan channels, there will be a problem that the design complexity of the sending terminal and the receiving terminal is increased.

SUMMARY OF THE INVENTION

In view of the above, the present invention provides a noise reduction method, device and system on the basis of touch detection of a capacitive screen, so as to improve the filtering performance of a filter and thereby the noise reduction effect is improved when a touch to a capacitive screen is detected, by improving a structure of the filter.

A noise reduction method on the basis of touch detection of a capacitive screen includes:

sending a first scanning waveform to all receiving terminals by a first sending terminal and then sending a second scanning waveform to all the receiving terminals by a second sending terminal during a detection time period, wherein the phase of the first scanning waveform is continuous with the phase of the second scanning waveform and the first scanning waveform has a same frequency as that of the second scanning waveform; and filtering a signal received by the receiving terminals after demodulating it.

In order to make the above solution perfect, preferably:

the detection time period is one or more scanning frames or a combination of several scanning waveforms, the durations of the scanning waveforms sent by all the above sending terminals are the same, the first sending terminal and the second sending terminal are sending terminals arranged sequentially on the capacitive screen.

Preferably:

filtering a signal received by the receiving terminals after demodulating it includes:

performing a first-stage pre-filtering to the signal received by the receiving terminals after demodulating it, to generate a first-stage filtering signal; and sending the first-stage filtering signal to an accumulator for processing.

Preferably:

filtering a signal received by the receiving terminals after demodulating it specifically includes:

performing a first-stage pre-filtering on the signal received by the receiving terminals after demodulating it, to generate a first-stage pre-filtering signal; and passing the first-stage pre-filtering signal sequentially through a first accumulator, a second-stage pre-filter and a second accumulator for processing.

Preferably:

filtering a signal received by the receiving terminals after demodulating it specifically includes:

performing a first-stage pre-filtering on the signal received by the receiving terminals after demodulating it, to generate a first-stage pre-filtering signal; and passing the first-stage pre-filtering signal sequentially through a first accumulator, a second-stage pre-filter and a second accumulator for processing, wherein the second-stage pre-filter has both low-pass characteristic and non-linear filtering characteristic.

A noise reduction device on the basis of touch detection of a capacitive screen includes:

a gating unit configured to perform control in such a way that a first sending terminal sends a first scanning waveform to all receiving terminals and then a second sending terminal sends a second scanning waveform to all the receiving terminals during a detection time period, wherein the phase of the first scanning waveform is continuous with the phase of the second scanning waveform and the first scanning waveform has a same frequency as that of the second scanning waveform, the detection time period is one or more scanning frames or a combination of several scanning waveforms;

a demodulator configured to demodulate a signal received by the receiving terminals; and a filtering unit configured to filter a signal received by the receiving terminals after demodulating it.

In order to make the above solution perfect, preferably:

the gating unit is specifically a gating switch, and is configured to perform control in such a way that the durations for the scanning waveforms sent by all the sending terminals are the same.

Preferably:

The filtering unit includes:

a first-stage pre-filter and an accumulator.

Preferably:

the filtering unit includes: a first-stage pre-filter, a first accumulator, a second-stage pre-filter and a second accumulator.

Preferably:

the filtering unit includes: a first-stage pre-filter, a first accumulator, a second-stage pre-filter and a second accumulator, wherein the second-stage pre-filter includes a non-linear filtering unit and a low-pass filtering unit.

A noise reduction system on the basis of touch detection of a capacitive screen including the above noise reduction device.

As can be seen from the above technical solution, the embodiments of the present invention can achieve non-gap scanning by performing continuation process to a scanning waveform, i.e. by achieving that the phases are continuous and the frequencies are the same. This kind of scanning can form a continuous scanning signal during a detection time period which includes at least two scanning frames. Thereby the receiving terminal is provided with a continuous and stable signal such that the filtering performance is improved. Thereby the limit to the extending of the scanning time at a sending terminal in the prior art is overcome, and the noise reduction effect can be achieved without increasing the design complexity of a sending terminal and a receiving terminal. Moreover, in the embodiments of the present invention there is disclosed a filter with improved structure and performance, which can cooperate with the above noise reduction method to achieve the effective and reliable noise reduction effect.

BRIEF DESCRIPTION OF THE DRAWINGS

The accompany drawings needed to be used in the description of the embodiments or the prior art will be described briefly as follows, so that the technical solutions according to the embodiments of the present invention or according to the prior art will become clearer. It is obvious that the accompany drawings in the following description are only some embodiments of the present invention. For the skilled in the art, other accompany drawings may be obtained according to these accompany drawings without any creative work.

DETAILED DESCRIPTION OF THE INVENTION

The technical solution according to the embodiments of the present invention will be described clearly and completely as follows in conjunction with the accompany drawings in the embodiments of the present invention. It is obvious that the described embodiments are only a part of embodiments according to the present invention rather than all of them. All other embodiments obtained by the skilled in the art based on the embodiments in the present invention without any creative work belong to the scope of protection of the present invention.

The embodiments of the present invention provides a noise reduction method, device and system on the basis of touch detection of a capacitive screen, so as to improve the filtering performance of a filter and thereby improve the noise reduction effect when a touch to a capacitive screen is detected, by improving a structure of the filter.

Before the explanation of the embodiments, it is needed to make clear that the noise reduction method is especially adapted to the detection for mutual-capacitance touch response, but it is not limited thereto.

Figure 1:
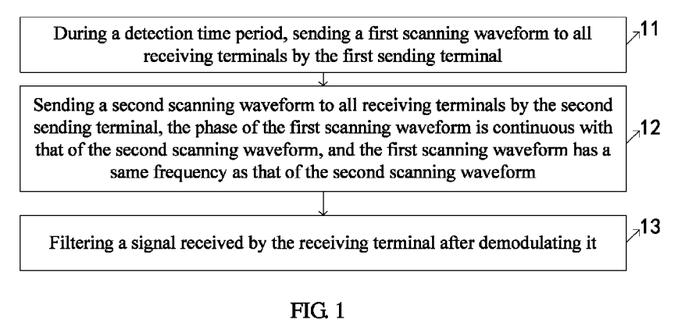
FIG. 1 is a flow chart of a noise reduction method on the basis of touch detection of a capacitive screen according to an embodiment of the present invention.

FIG. 1 shows a noise reduction method on the basis of touch detection of a capacitive screen including the following steps:

Step 11: A first sending terminal sends a first scanning waveform to all receiving terminals during a detection time period;

Step 12: A second sending terminal sends a second scanning waveform to all the receiving terminals. The phase of the first scanning waveform is continuous with that of the second scanning waveform and the first scanning waveform has a same frequency as that of the second scanning waveform. The detection time period is one or more scanning frames or a combination of several scanning waveforms;

Under the environment of an existing detection method, it is described in the way that sending terminals TX perform sequential scans. That is to say the first sending terminal and the second sending terminal are two sending terminals that are sequentially arranged on an ITO layer of a capacitive screen. Assuming that the total number of the TX channels are n, then after TX1 is scanned, the channel to be scanned is TX2, TX3, . . . , till TXn. The duration of a scanning frame is equal to the sum of the n TX channels. In an existing channel scanning situation, there will be a gap for each scan and a continuous signal can not be formed at the same receiving terminal. Even if the signal is processed by filtering or other ways, an output with good filtering performance can not be obtained, i.e., the noise reduction effect is not ideal. In the present embodiment, the first sending terminal and the second sending terminal may be located at any spatial location on the capacitive screen. It is needed that a gating switch is used to gate a certain TX at appropriate time. The scanning time of each TX may be the same as that of other TXs or different, as long as the phases are continuous and the frequencies are the same. The sum of the scanning times of all the n TXs is the duration of a scanning frame. It is needed to be explained that in the present embodiment a continuous M TXs can be obtained by the scanning performed in a way in which each channel is sequentially scanned, where M may be greater or smaller than the total number of TXs in one scanning frame. Alternatively, the scanning sequence of TXs may also be in other ways. For example the scanning sequence may be TX2→TX4→TX1 . . . other than TX1→TX2→TX3 . . . which is a sequential scan, that is to say the scanning sequence is not specifically limited.

Figure 2:
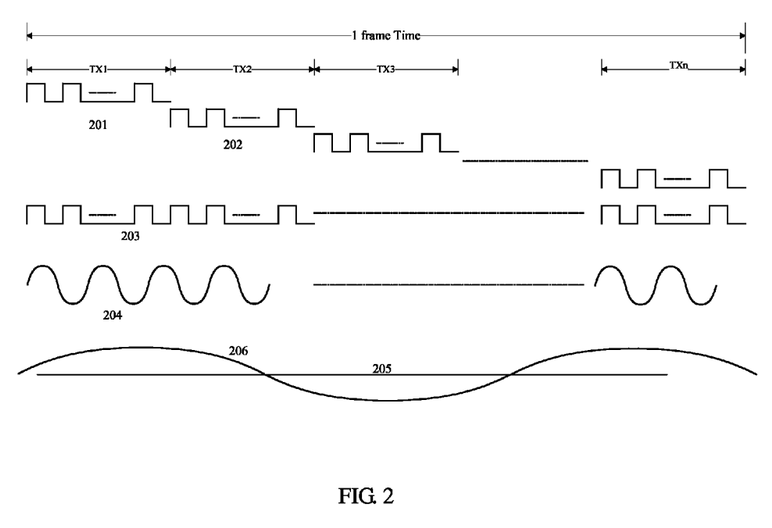
FIG. 2 is a waveform chart of the noise reduction method on the basis of touch detection of a capacitive screen according to an embodiment of the present invention.

As shown in FIG. 2, the scanning between the first scanning waveform 201 and the scanning waveform 202 is a waveform whose phase is completely continuous. For a same receiving terminal RX, the received scanning waveform is shown as 203 and is a scanning waveform having a continuous phase and the duration of one scanning frame. A direct current signal 205 is obtained after the waveform passes a demodulator. A low frequency alternating signal 206 is obtained after a touch signal mixed with noise 204 passes a demodulator at the receiving terminal. According to a conventional way of the scanning, if there is a gap between the TX scans, a continuous signal can not be obtained by overlapping the alternating signal 206 onto the direct current signal 205. Even the signal is processed by filtering or other ways, a correct output still can not be obtained. Therefore, the detection effect is influenced.

The direct current signal 205 overlapped with the alternating signal 206 constitutes an output obtained after the signal including noise passes a demodulator. Since the TX employs the continuous scan, the direct current signal 205 overlapped with the alternating signal 206 is a continuous signal which can accept the digital filtering process, as described in Step 13. The direct component represented by the direct current signal 205 is a waveform needed by the detection, while the alternating component represented by the alternating signal 206 is the noise which may interfere with the result of the detection. Therefore, the filtering is further needed to reduce noise and output a correct waveform.

Step 13: A signal received by the receiving terminal is filtered after demodulation.

It is needed to explain that the receiving terminal needs to generate an electric charge signal via a coupling capacitor at a touch detection point of the corresponding channel for the scanning waveform sent by the sending terminal, namely the excitation signal. The electric charge signal is converted and amplified to generate a voltage signal. The voltage signal undergoes analog-digital conversion, the signal demodulation, and the filtering described in this step.

For the filtering step 13, a filter is a hardware device for implementing this step. For the filter of the accumulator structure in the background or a filter in other forms, enough amounts of signals are always needed to ensure good filtering performance. Therefore, this effect can be achieved by extending the duration for the filter to provide stable output. That is to say, when a non-gap scanning is performed, it can be considered that a continuous scanning signal, the whole scanning frame, and the data between different frames can be jointed together without any gap, so as to recover the noise and effective signal which are continuous and stable, thereby the same effect as the effect of extending the scanning time is obtained. Compared with some methods in the prior art for increasing the amount of the signals, the present method does not increase the design complexity for the receiving terminal and the sending terminal and can also greatly increase the scanning time.

Figure 3:
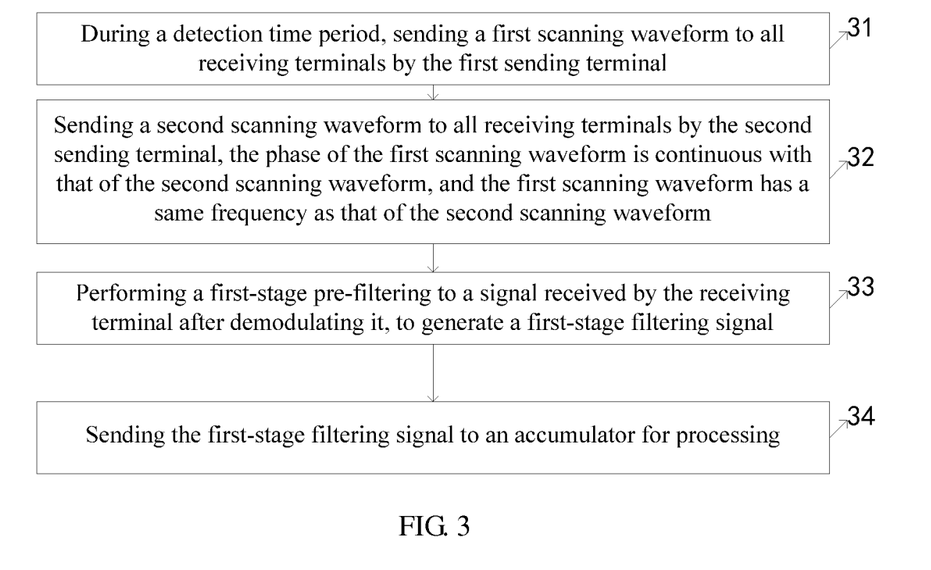
FIG. 3 is a flow chart of a noise reduction method on the basis of touch detection of a capacitive screen according to another embodiment of the present invention.

FIG. 3 shows another noise reduction method on the basis of touch detection of a capacitive screen including the following steps.

Step 31: A first sending terminal sends a first scanning waveform to all receiving terminals during a detection time period;

Step 32: A second sending terminal sends a second scanning waveform to all the receiving terminals. The phase of the first scanning waveform is continuous with the phase of the second scanning waveform and the first scanning waveform has a same frequency as that of the second scanning waveform;

Step 33: A signal received by the receiving terminal is demodulated and then undergoes a first-stage pre-filtering, to generate a first-stage filtering signal;

Step 34: The first-stage filtering signal is sent to an accumulator for processing.

According to the analysis of the above embodiments, if the frequency of the noise signal is very close to the scanning frequency of TX, in the case of a low frequency of the alternating current signal 206 will bring very high requirements to a low-pass filter, the filtering process corresponding to the filter may not meet the requirements. The filtering method in the present embodiment can further improve the filtering process and optimize the noise reduction function according to characteristics of some noise.

Moreover, the first-stage filtering signal can be processed sequentially by the first accumulator, the second-stage pre-filter and the second accumulator.

Furthermore, the second-stage pre-filter has both the low-pass characteristic and the non-linear filtering characteristic. The characteristics can be implemented by software or by a hardware circuit or module, or by the combination of software and hardware, but it is not limited thereto.

The implementing principles of the above hardware circuit or module for the filtering process will be described in detail in conjunction with the illustrations and explanations of FIGS. 5-7 in the description.

Figure 4:
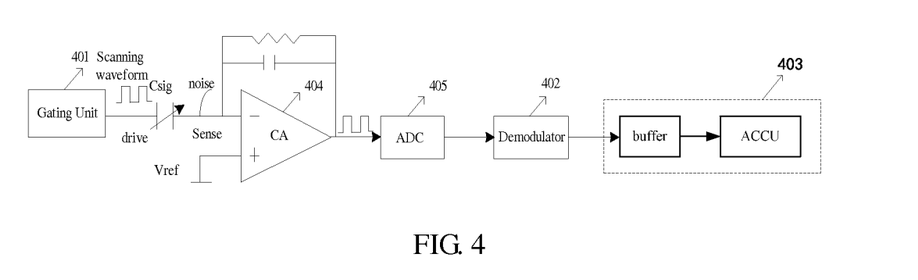
FIG. 4 is a structural schematic diagram of a noise reduction device on the basis of touch detection of a capacitive screen according to an embodiment of the present invention.

FIG. 4 shows a noise reduction device on the basis of touch detection of a capacitive screen, including:

a gating unit 401 configured to perform control in such a way that a first sending terminal sends a first scanning waveform to all receiving terminals and a second sending terminal sends a second scanning waveform to all the receiving terminals during a detection time period, wherein the phase of the first scanning waveform is continuous with that of the second scanning waveform and the first scanning waveform has a same frequency as that of the second scanning waveform, the detection time period is one or more scanning frames or a combination of several scanning waveforms;

a demodulator 402 configured to demodulate a signal received by the receiving terminals; and a filtering unit 403 configured to filter a signal received by the receiving terminals after demodulating it.

As can be seen from FIG. 4, other circuits and modules that cooperate with the above components to complete the detection include: an amplifier 404 and an analog-digital converter ADC 405. Of course, the demodulator 402 may be set ahead of the analog-digital converter ADC. That is to say the demodulator may also be implemented by an analog method, but it is not limited thereto. The embodiments of the devices and systems in the description are all described with a digital method (the analog-digital conversion is preformed before the demodulation process).

The gating unit in this device can be implemented by software or by a hardware circuit or module, or by the combination of software and hardware, but it is not limited thereto. The filtering unit may have the accumulator structure. When a non-gap scanning is performed, it can be considered that a continuous scanning signal, the whole scanning frame, and the data between different frames can be jointed together without any gap, so as to recover the noise and effective signal which are continuous and stable, so as to obtain the same effect as the effect of extending the scanning time. Compared with some of the methods for increasing the amount of the signals, the present method does not increase the design complexity for the receiving terminal and the sending terminal and can also greatly increase the scanning time.

Figure 5:
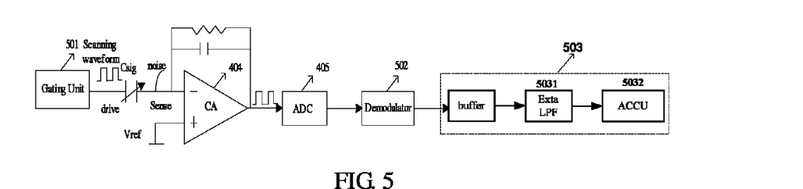
FIG. 5 is a structural schematic diagram of a noise reduction device on the basis of touch detection of a capacitive screen according to another embodiment of the present invention.

FIG. 5 shows another noise reduction device on the basis of touch detection of a capacitive screen, including:

a gating unit 501 configured to perform control in such a way that a first sending terminal sends a first scanning waveform to all receiving terminals and a second sending terminal sends a second scanning waveform to all the receiving terminals during a detection time period, wherein the phase of the first scanning waveform is continuous with that of the second scanning waveform and the first scanning waveform has a same frequency as that of the second scanning waveform, the detection time period is one or more scanning frames or a combination of several scanning waveforms;

a demodulator 502 configured to demodulate a signal received by the receiving terminals; and a filtering unit 503 configured to filter a signal received by the receiving terminals after demodulating it, wherein the filtering unit 503 includes: a first-stage pre-filter 5031 and an accumulator 5032.

As shown in this figure, the filtering performance is improved compared to the case where there is only a single pre-filter, after the first-stage pre-filter 5031 being connected in series with the accumulator 5032. In the present embodiment, since there are enough amounts of signals and it is needed to provide necessary stable time for the filter, the filtering unit 503 may have the accumulator structure or be other filers with better performance, such as various FIR or IIR filters. It can be seen that the anti-noise performance is no longer limited by the scanning time by using this method of the present invention. Therefore, better anti-noise effect can be achieved.

Figure 6:
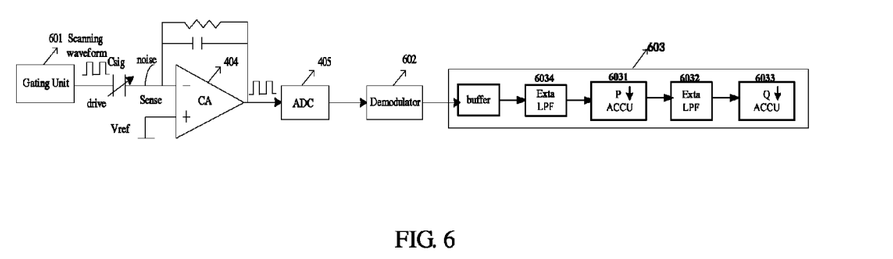
FIG. 6 is a structural schematic diagram of a noise reduction device on the basis of touch detection of a capacitive screen according to a further embodiment of the present invention.

FIG. 6 shows a further noise reduction device on the basis of touch detection of a capacitive screen, including:

a gating unit 601 configured to perform control in such a way that a first sending terminal sends a first scanning waveform to all receiving terminals and a second sending terminal sends a second scanning waveform to all the receiving terminals during a detection time period, wherein the phase of the first scanning waveform is continuous with that of the second scanning waveform and the first scanning waveform has a same frequency as that of the second scanning waveform, the detection time period is one or more scanning frames or a combination of several scanning waveforms;

a demodulator 602 configured to demodulate a signal received by the receiving terminals; and a filtering unit 603 configured to filter a signal received by the receiving terminals after demodulating it, wherein the filtering unit 603 includes: a first accumulator 6031, a second-stage pre-filter 6032, a second accumulator 6033 and a first-stage pre-filter 6034.

It can be seen in this embodiment that the accumulator on one hand implements the function of a low pass filtering, and on the other hand it is also a process of the down-sampling filtering. Assuming that the accumulator 5032 in the previous embodiment is an N-point accumulation, in that embodiment it is decomposed into the first accumulator namely a P-point accumulator 6031 and the second accumulator 6033 namely a Q-point accumulator which are connected in series, and the accumulation relationship is N=P*Q. Since an exchange of the positions of the filters in cascade connection does not affect the effect of the filtering, the first accumulator 6031 namely the P-point accumulator can be moved to be ahead of the second-stage pre-filter 6032. Since the first accumulator 6031 may act as a P fold down-sampling, the sampling ratio of a signal input into the second-stage pre-filter 6032 is P times smaller than the sampling ratio of a signal input into the accumulator 5032 in the previous embodiment. Therefore, the complexity of the second-stage pre-filter 6032 is smaller than the complexity of the filtering unit 503 in the previous embodiment and the power consumption can be reduced. By the implementing form of the present embodiment, the filter orders of the second-stage pre-filter 6032 are greatly reduced and the cost of the hardware is also reduced without affecting the overall noise reduction performance. Furthermore, according to the characteristic of the cascade connection, any adjustments or combinations thereof can be performed to the first accumulator 6031, the second-stage pre-filter 6032 and the second accumulator 6033.

Not only a periodical noise but also a pulse noise (often found in an electricity charger) can be reduced by the method in the present embodiment. The pulse waveform of the pulse noise is smoothed due to the low pass effect of the first pre-filtering. Therefore, the influence of the pulse interference is reduced and the influence of the pulse interference on the judgment of a touch is also reduced.

Figure 7:
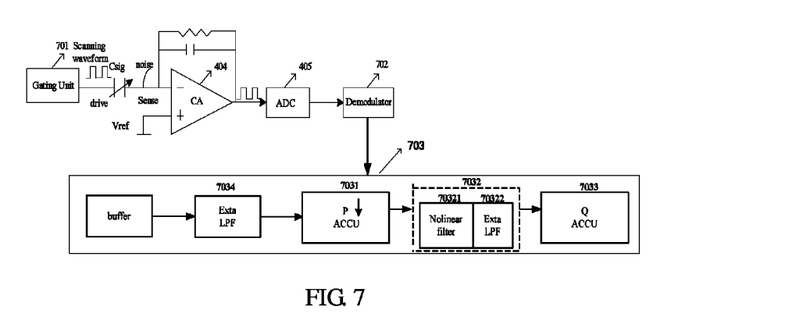
FIG. 7 is a structural schematic diagram of a noise reduction device on the basis of touch detection of a capacitive screen according to a still further embodiment of the present invention.

FIG. 7 shows a still further noise reduction device on the basis of touch detection of a capacitive screen, including:

a gating unit 701 configured to perform control in such a way that a first sending terminal sends a first scanning waveform to all receiving terminals and a second sending terminal sends a second scanning waveform to all the receiving terminals during a detection time period, wherein the phase of the first scanning waveform is continuous with that of the second scanning waveform and the first scanning waveform has a same frequency as that of the second scanning waveform, the detection time period is one or more scanning frames or a combination of several scanning waveforms;

a demodulator 702 configured to demodulate a signal received by the receiving terminals; and a filtering unit 703 configured to filter a signal received by the receiving terminals after demodulating it, wherein the filtering unit 703 includes: a first accumulator 7031, a second-stage pre-filter 7032, a second accumulator 7033 and a first-stage pre-filter 7034, wherein the second-stage pre-filter 7032 includes a non-linear filtering unit 70321 and a low-pass filtering unit 70322.

In order to improve the pre-filtering effect of the second-stage pre-filter 7032, it can be made a hybrid filter which has both low-pass characteristic and non-linear filtering characteristic. The example about the pulse noise in the previous embodiment is continued to be explained. The influence of the pulse noise after hybrid filtering is reduced to the extent such that the pulse noise does not have any influence on a normal capacitive screen. Similarly, the non-linear filtering unit 70321, the low-pass filtering unit 70322 and the second accumulator 7033 may be combined or exchange settings.

Figure 8:
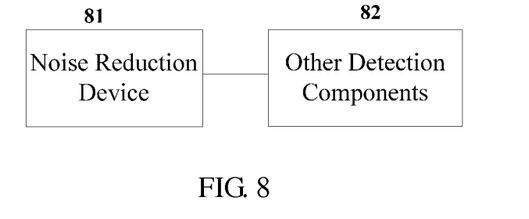
FIG. 8 is a structural schematic diagram of a noise reduction system on the basis of touch detection of a capacitive screen according to an embodiment of the present invention.

FIG. 8 shows a noise reduction system on the basis of touch detection of a capacitive screen including a noise reduction device 81 on the basis of touch detection of a capacitive screen and other detection components 82.

The structure and function of the noise reduction device can be referred to the illustrations of FIGS. 1-7 and the corresponding explanation for FIGS. 1-7, and therefore are not repeated any more. Other detection device may cooperate with the noise reduction device to complete the touch detection process.

In general, the embodiments of the present invention can achieve the non-gap scanning by performing continuation process to the scanning waveform, i.e. by achieving that the phases are continuous and the frequencies are the same. This kind of scanning can form a continuous scanning signal during the detection time period which includes at least two scanning frames. Thus the receiving terminal is provided with a continuous and stable amount of signals so that the filtering performance is improved. The limit on extending the scanning time of the sending terminal in the prior art is overcome and the noise reduction effect can be achieved without increasing the design complexity of the sending terminal and the receiving terminal. Moreover, in the embodiments of the present invention there is disclosed the filter with improved structure and performance, which can cooperate with the above noise reduction method to achieve the effective and reliable noise reduction effect.

The embodiments of the present invention are described herein in a progressive manner, with the emphasis of each of the embodiments placed on its difference from other embodiments; hence, for the same or similar parts, the embodiments can refer to each other. For the device and system disclosed in the embodiments, since the device and system correspond to the methods disclosed in the embodiments, the corresponding descriptions are relatively simple. The relevant portion may be referred to the description for the methods.

The skilled in the art can further realize that the illustrative units and algorithm steps described in the embodiments disclosed herein may be implemented by an electronic hardware, computer software or the combination thereof. In order to illustrate clearly the interchangeability of the hardware and the software, the components and steps of each of the examples are generally described according to functions in the above explanation. Whether these functions are implemented in a way of hardware or software depends on the specific applications and design constraints. The skilled in the art can use different methods for each of the specific applications to implement the described function, but this implement should not be considered as being out of the scope of the present invention.

The description of the embodiments herein enables those skilled in the art to implement or use the present invention. Numerous modifications to the embodiments will be apparent to those skilled in the art, and the general principle herein can be implemented in other embodiments without deviation from the spirit or scope of the embodiments of the present invention. Therefore, the present invention will not be limited to the embodiments described herein, but should be in accordance with the widest scope consistent with the principle and novel features disclosed herein.

What is claimed is:

1. A noise reduction method on the basis of touch detection of a capacitive screen, comprising:
    alternately sending a first scanning waveform and a second scanning waveform to receiving terminals during a detection time period, wherein:
        the first scanning waveform and the second scanning waveform each have a number of pulses,
        a phase of the first scanning waveform is continuous with a phase of the second scanning waveform, and
        a frequency of the first scanning waveform is equal to a frequency of the second scanning waveform;
    filtering the first scanning waveform and the second scanning waveform received by the receiving terminals after demodulating the first scanning waveform and the second scanning waveform, comprising:
        performing a first-stage pre-filtering on the first scanning waveform and the second scanning waveform received by the receiving terminals to generate a first-stage pre-filtering signal; and
        passing the first-stage pre-filtering signal sequentially through a first accumulator, a second-stage pre-filter, and a second accumulator for processing.

2. The noise reduction method according to claim 1, wherein the detection time period is one or more scanning waveforms or a combination of several scanning waveforms.

3. The noise reduction method according to claim 1, wherein durations of the first and second scanning waveforms are the same.

4. The noise reduction method according to claim 1, wherein;
    the first scanning waveform is sent by a first sending terminal,
    the second scanning waveform is sent by a second sending terminal, and
    the first sending terminal and the second sending terminal are sending terminals arranged sequentially on the capacitive screen.

5. The noise reduction method according to claim 1, wherein the second-stage pre-filter has both a low-pass characteristic and a non-linear filtering characteristic.

6. The noise reduction method according to claim 1, wherein the filtering the first scanning waveform and the second scanning waveform received by the receiving terminals after demodulating the first scanning waveform and the second scanning waveform comprises:
    obtaining a first demodulated scanning waveform and a second demodulated scanning waveform; and
    filtering the first demodulated scanning waveform and the second demodulated scanning waveform after obtaining the first demodulated scanning waveform and the second demodulated scanning waveform.

7. The noise reduction method according to claim 1, wherein the first scanning waveform and the second scanning waveform are square waveforms.

8. A noise reduction device on the basis of touch detection of a capacitive screen, comprising:
    a gating unit configured to perform control in such a way that a first scanning waveform and a second scanning waveform are sent alternately to receiving terminals during a detection time period, wherein
 the first scanning waveform and the second scanning waveform each have a number of pulses,
 a phase of the first scanning waveform is continuous with a phase of the second scanning waveform,
 a frequency of the first scanning waveform is equal to frequency of the second scanning waveform, and
 the detection time period is one or more scanning waveforms or a combination of several scanning waveforms;
a demodulator configured to demodulate the first scanning waveform and the second scanning waveform received by the receiving terminals; and
a filtering unit configured to filter the first scanning waveform and the second scanning waveform received by the receiving terminals,
 wherein the filtering unit comprises: a first-stage pre-filter, a first accumulator, a second-stage pre-filter, and a second accumulator.

9. The noise reduction device according to claim 8, wherein the gating unit comprises a gating switch configured to perform control in such a way that durations of the scanning waveforms sent by the sending terminals are equal.

10. The noise reduction device according to claim 8, wherein the second-stage pre-filter comprises a non-linear filtering unit and a low-pass filtering unit.

11. The noise reduction device according to claim 8, wherein:
 the first scanning waveform and the second scanning waveform are square waveforms;
 the demodulator obtains a first demodulated scanning waveform and a second demodulated scanning waveform after the first scanning waveform and the second scanning waveform received by the receiving terminals are demodulated; and
 the filtering unit filters the first demodulated scanning waveform and the second demodulated scanning waveform after the first demodulated scanning waveform and the second demodulated scanning waveform are obtained.

12. A noise reduction system on the basis of touch detection of a capacitive screen, comprising the noise reduction device according to claim 8.

13. A noise reduction system on the basis of touch detection of a capacitive screen, comprising the noise reduction device according to claim 9.

14. A noise reduction system on the basis of touch detection of a capacitive screen, comprising the noise reduction device according to claim 10.

* * * * *